(12) United States Patent
Kettner-Reich

(10) Patent No.: US 8,704,125 B2
(45) Date of Patent: Apr. 22, 2014

(54) LASER PROCESSING MACHINE HAVING EXPANDED WORK SPACE

(75) Inventor: Andreas Kettner-Reich, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 89 days.

(21) Appl. No.: 12/940,608

(22) Filed: Nov. 5, 2010

(65) Prior Publication Data

US 2011/0068089 A1 Mar. 24, 2011

Related U.S. Application Data

(63) Continuation of application No. PCT/EP2009/003206, filed on May 5, 2009.

(30) Foreign Application Priority Data

May 8, 2008 (DE) .................. 10 2008 022 449

(51) Int. Cl.
*B23K 26/14* (2006.01)

(52) U.S. Cl.
USPC .................................. 219/121.67; 219/121.6

(58) Field of Classification Search
USPC ................. 219/121.6, 121.61, 121.62, 121.67
See application file for complete search history.

(56) References Cited

U.S. PATENT DOCUMENTS

| | | | |
|---|---|---|---|
| 4,583,719 A | | 4/1986 | Klingel |
| 5,285,045 A | * | 2/1994 | Ito et al. .................. 219/121.77 |
| 5,302,798 A | * | 4/1994 | Inagawa et al. ............ 219/121.7 |
| 5,565,119 A | * | 10/1996 | Behun et al. ............. 219/121.63 |
| 6,180,913 B1 | * | 1/2001 | Kolmeder et al. ........ 219/121.68 |
| 6,564,442 B2 | * | 5/2003 | Kilian et al. .................... 29/560 |
| 6,838,639 B2 | | 1/2005 | Kreuter et al. |
| 7,098,423 B2 | | 8/2006 | Masuda et al. |
| 7,164,099 B2 | * | 1/2007 | Hata et al. ................ 219/121.79 |
| 7,875,828 B2 | * | 1/2011 | Jung et al. ................ 219/121.78 |
| 8,263,898 B2 | * | 9/2012 | Alber ....................... 219/121.64 |
| 2002/0093747 A1 | * | 7/2002 | Gernhart et al. .............. 359/862 |
| 2004/0173590 A1 | * | 9/2004 | Hata et al. ................ 219/121.77 |
| 2006/0249486 A1 | | 11/2006 | Rippl | |

FOREIGN PATENT DOCUMENTS

| | | |
|---|---|---|
| DE | 19620391 A1 | 11/1997 |
| DE | 10006516 A1 | 8/2001 |
| DE | 20306581 U1 | 10/2004 |
| DE | 102005025556 A1 | 12/2005 |
| DE | 102006021622 A1 | 11/2007 |
| EP | 0123183 B1 | 11/1987 |
| JP | 59127987 | 7/1984 |
| JP | 3604470 A1 | 8/1987 |
| JP | 01154891 | 6/1989 |
| JP | 02133187 | 5/1990 |

(Continued)

OTHER PUBLICATIONS

Trumpf Werkzeugmashinen GmbH + Co., "Technical Telegram—Laser Welding in Sheet Metal Fabrication", Oct. 2006, 14 pages.
Trumpf Werkzeugmashinen GmbH + Co., "Product Information—TruLaser 7025 and TruLaser 7040", Oct. 26, 51 pages.
International Search Report from corresponding PCT Application No. PCT/EP2009/003206, mailed Aug. 27, 2009, 3 pages.

(Continued)

*Primary Examiner* — Henry Yuen
*Assistant Examiner* — Ayub Maye
(74) *Attorney, Agent, or Firm* — Fish & Richardson P.C.

(57) ABSTRACT

A laser processing machine has an expanded operating space so that larger workpieces can be processed and/or the spatial requirement for the laser processing machine is reduced.

19 Claims, 4 Drawing Sheets

(56) References Cited

FOREIGN PATENT DOCUMENTS

| | | |
|---|---|---|
| JP | 3138092 | 6/1991 |
| JP | 6000581 | 1/1994 |
| JP | 726085 | 5/1995 |
| JP | 09168883 | 6/1997 |
| KR | 20010013244 A | 2/2001 |
| WO | 2005099979 A1 | 10/2005 |

OTHER PUBLICATIONS

Notification of Transmittal of Translation of the International Preliminary Report on Patentability from corresponding PCT Application No. PCT/EP2009/003206, mailed Dec. 29, 2010, 6 pages.

English translation of Office Action from corresponding Korean Application No. 10-2010-7025897, delivered Sep. 10, 2013, 14 pages.

* cited by examiner

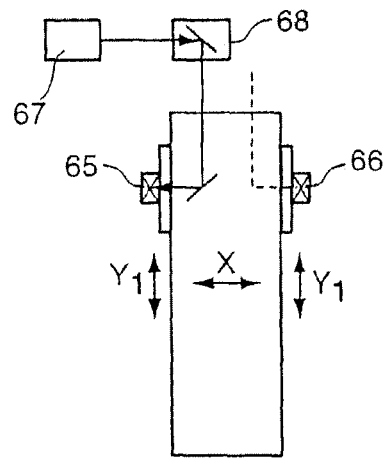
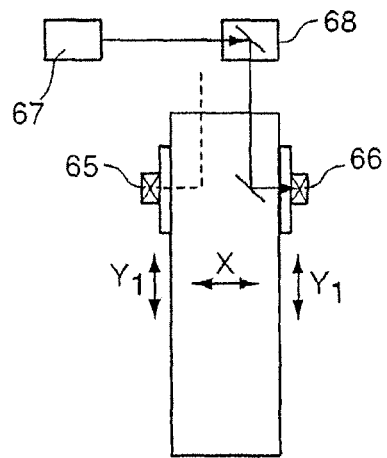
Fig. 4a  Fig. 4b
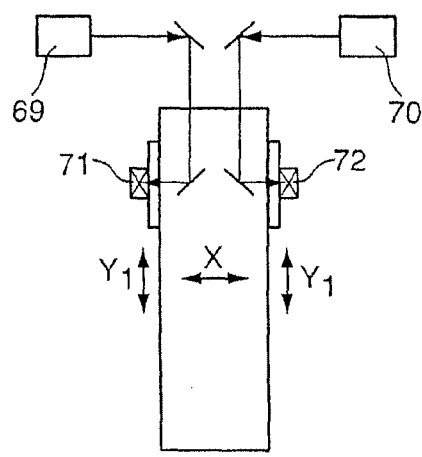
Fig. 5

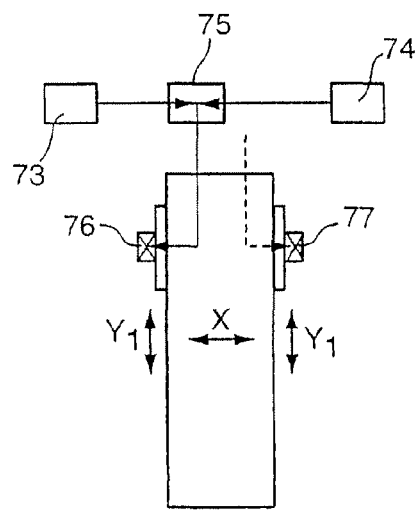
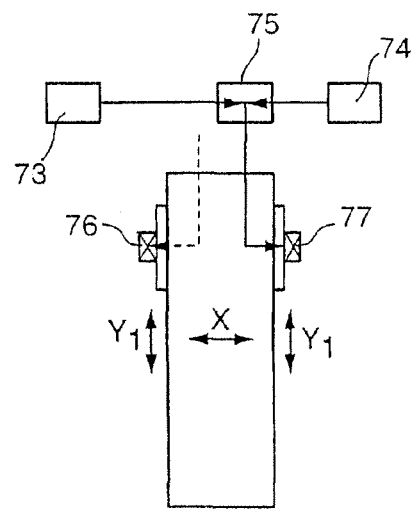
Fig. 6a            Fig. 6b
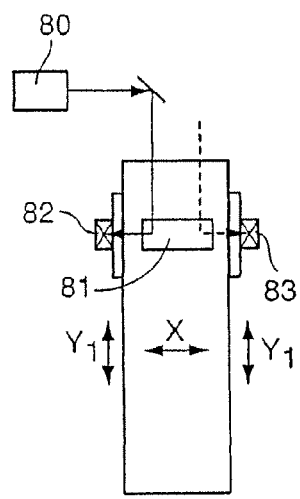
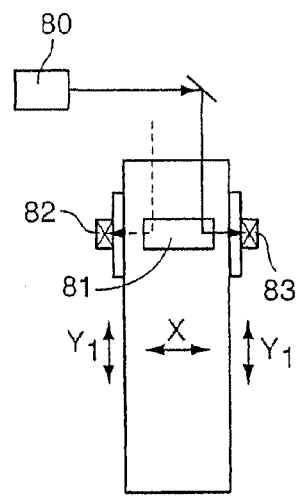
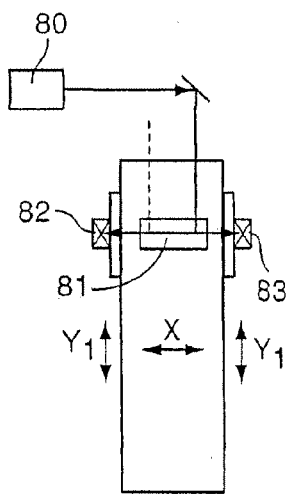
Fig. 7a            Fig. 7b            Fig. 7c

LASER PROCESSING MACHINE HAVING EXPANDED WORK SPACE

CROSS-REFERENCE TO RELATED APPLICATIONS

This application is a continuation of, and claims priority under 35 U.S.C. §120 from, PCT/EP2009/003206, filed on May 5, 2009, and designating the U.S., which claims priority under 35 U.S.C. §119 to German Patent Application No. 10 2008 022 449.9, filed on May 8, 2008. The contents of the prior applications are hereby incorporated by reference in their entirety.

TECHNICAL FIELD

The invention relates to a laser processing machine having expanded work space.

BACKGROUND

There are known, for example, from JP 03-138092 A, laser processing machines in which a workpiece that is to be processed is placed on a workpiece support. The laser processing machine can include a portal arranged above the workpiece support. The portal can be moved in the longitudinal direction of the workpiece. A laser processing head can be arranged at one side of the portal. The laser processing head can be moved relative to the workpiece by the movement of the portal. Using the laser processing head, it is possible to process a workpiece. With the known configuration of a laser processing machine, workpieces that are smaller than the base surface of the laser processing machine can be processed.

de 196 20 391 A1 discloses a device for processing planar objects which comprise a non-metal carrier material, such as, for example, paper, cardboard, plastics material or the like. The device can have an operating plane in which an object to be processed is arranged. The device can include an arm that extends over the operating plane. The arm can be guided so as to be able to be displaced over the entire processing plane in one direction. The device can also include a processing head for processing the object. The processing head can be guided so as to be able to be displaced on the arm at right angles relative to the movement direction thereof. In particular, a plurality of processing heads may be provided on the arm. The processing heads can be constructed for drawing, cutting or grooving the non-metal carrier material.

DE 36 04 470 A1 discloses a material processing station having a processing unit that can be positioned along three mutually perpendicular axes. To this end, a support is generally arranged perpendicularly and provided with horizontally extending spindle drives for a sliding member, which in turn is provided with spindle drives and can be displaced perpendicularly relative to the floor. This sliding member receives the processing unit, which in turn can be displaced perpendicularly relative to the plane of the support.

WO 2005/099979 A1 discloses a device in which two laser beam processing heads are arranged on a common sliding member.

DE 203 06 581 U1 discloses a laser welding device for welding components of vehicle bodies, including a plurality of laser welding heads that are constructed as remote lasers and are arranged with spacing relative to the component.

DE 100 06 516 A1 discloses a method for processing workpieces by means of a plurality of laser beams, a plurality of laser beams being combined via a beam unifier and being directed onto a workpiece via a common beam guide.

DE 10 2005 025 506 A1 discloses a laser processing machine that is configured to process a sheet-like workpiece. The sheet-like workpiece is secured to a processing table by means of relative movement of the processing table and laser collimation and positioning means and, by repeatedly moving the sheet-like workpiece in the longitudinal direction, to fix a region that is intended to be processed next in position on the processing table when the processing of a region to be processed is completed.

SUMMARY

In general, this invention relates to a laser processing machine having an expanded work space.

One aspect of the present invention provides a laser processing machine that has an expanded operating space so that larger workpieces can be processed and/or the spatial requirement for the laser processing machine is reduced.

According to one aspect, a laser processing machine has at least one laser processing head arranged at each of two opposing sides of a carrier structure. The laser processing machine also includes a beam deflector by means of which a laser beam of a beam generator can be switched between the laser processing heads. The operating ranges of the mutually opposing laser processing heads overlap and extend each other in a gap-free manner. A machine base surface and the operating range, which is substantially defined by the movability of a laser processing head in the X and Y direction, can thereby almost be caused to overlap. It is consequently possible either for the operating range to be increased so that larger workpieces can be processed or for the spatial requirement, in particular the base surface-area requirement of the laser processing machine, to be decreased. The technical advantage in terms of production is that, as before, a machine with laser processing heads on only one side of the carrier structure can be produced and the customer can decide very late whether he also wishes needs/to have laser processing heads at the opposing side.

Another aspect features a laser processing machine that includes a workpiece apparatus (e.g., a workpiece support and/or a workpiece retaining member) for supporting or retaining a workpiece to be processed, a laser beam generator, a carrier structure carrying at least two laser processing heads for directing a laser beam from the laser beam generator at a workpiece supported on or retained by the workpiece apparatus, and a beam deflector operable to switch the laser beam between the laser processing heads. Relative positioning of the laser processing heads and the workpiece apparatus is alterable to direct the laser beam to different points. The laser processing heads include a first laser processing head on one side of the carrier structure, and a second laser processing head on another side of the carrier structure.

In another aspect, a laser processing machine includes a workpiece apparatus (e.g., a workpiece support and/or a workpiece retaining member) for supporting or retaining a workpiece to be processed, a laser beam generator, a carrier structure carrying at least two laser processing heads for directing a laser beam from the laser beam generator at a workpiece supported on or retained by the workpiece apparatus, and a beam deflector operable to switch the laser beam between the laser processing heads. Relative positioning of the carrier structure and the workpiece apparatus is alterable to direct the laser beam to different points. The laser processing heads are spaced apart along a tool axis, such that a combined distance traversable by the first and second laser processing heads along the tool axis is greater than an extent of relative movement between the carrier structure and the workpiece apparatus along the tool axis.

Implementations may provide one or more of the following features and/or to advantages.

In some implementations, the beam deflector can be controlled and may be arranged so as to be able to move so that the laser beam can be redirected onto one laser processing head or the other.

In certain implementations, the carrier structure carries at least two laser processing heads on each of two sides of the carrier structure. Owing to this multiplication of the laser processing heads, particularly good use can be made of the operating range. The base surface-area of the laser processing machine can be substantially identical to the operating range of the laser processing heads. In addition, the workpiece can be processed at the same time at several locations so that a higher processing rate can be implemented.

In some implementations, the laser processing heads are movable along the carrier structure. This can allow the laser processing head to access almost all regions of a workpiece. In some cases, it may be simpler to move the laser processing heads along the carrier structure than to move the workpiece relative to the carrier structure since a greater mass may thereby have to be moved.

In certain implementations, laser processing heads that are arranged at the same side of the carrier structure are movable independently of each other or in a coupled state. During the processing of the workpiece, it is possible to switch from one laser processing head to the other laser processing head.

In some cases, the switching from one laser processing head to the other laser processing head can also be carried out in another axial direction, such as from one laser processing head that is arranged at a first side of the carrier structure to a laser processing head that is arranged at the opposite side of the carrier structure. Laser processing heads that are arranged at different sides of the carrier structure can be moved along the carrier structure either in a coupled state or independently of each other.

In some implementations, at least one of the laser processing heads has an additional control axis. It is thereby possible to carry out a highly dynamic workpiece processing operation in a locally limited manner.

In certain implementations, the carrier structure is movable relative to the workpiece apparatus. It is thereby possible to make even better use of the operating space.

In certain implementations, a plurality of the laser processing heads can be mounted to the carrier structure on a common sliding member. Consequently, the laser processing heads can be moved together relative to the carrier structure by means of the common sliding member.

In some implementations, at least one of the mounted laser processing heads is movable relative to the sliding member, e.g., in a linear manner. Consequently, the relative position of one laser processing head relative to the other laser processing head on the same sliding member can be changed. Furthermore, a highly dynamic workpiece processing operation may be possible.

In certain implementations, the mounted laser processing heads are movable relative to the sliding member independently of each other or in a coupled state, e.g., in a linear manner.

If at least two laser processing heads are provided, there are various possibilities for adjusting power, depending on the workpieces to be processed.

In some implementations, the laser processing machine includes at least two beam generators. For example, it is possible to provide as many beam generators as there are laser processing heads. The beam generators may be fixedly associated with a laser processing head. By skillfully nesting workpieces of the same type, it is possible to process two workpieces at the same time, by fitting two beam generators. It is further conceivable for the power of a beam generator to be divided at an appropriate location and to be redirected to two laser processing heads. To this end, the laser processing machine may also include a beam splitter module that is arranged to split a laser beam between the processing heads.

In some cases, it is also possible to combine the beams of two beam generators at an appropriate location to form one energy beam. To this end, the laser processing machine may include a beam coupler. The beam coupler can in turn be connected to a beam deflector. Alternatively or additionally, the beam deflector may be movable so that the beam coupler can also be used as a deflector and can supply the energy beam to various laser processing heads.

In certain implementations, the laser processing machine includes a partition wall that is positioned between two workpiece processing areas such that a workpiece processing operation can be carried out at one side of the partition wall, whilst, at the other side of the partition wall, a workpiece can be loaded or unloaded. If the partition wall is removed, larger workpieces can also be processed.

Other features and advantages of the invention will be appreciated from the following description of embodiments of the invention with reference to the Figures of the drawings, which illustrate details which are significant to the invention, and from the claims. The individual features can be implemented individually or together in any combination in a variant of the invention.

DESCRIPTION OF DRAWINGS

FIGS. 4a and 4b show a laser processing machine having a beam deflector.

FIG. 5 shows a laser processing machine having two beam generators.

FIGS. 6a and 6b show a laser processing machine having a beam coupling module.

FIGS. 7a-7c show a laser processing machine having a beam guiding module.

DETAILED DESCRIPTION

Figures 1, 2, 3:
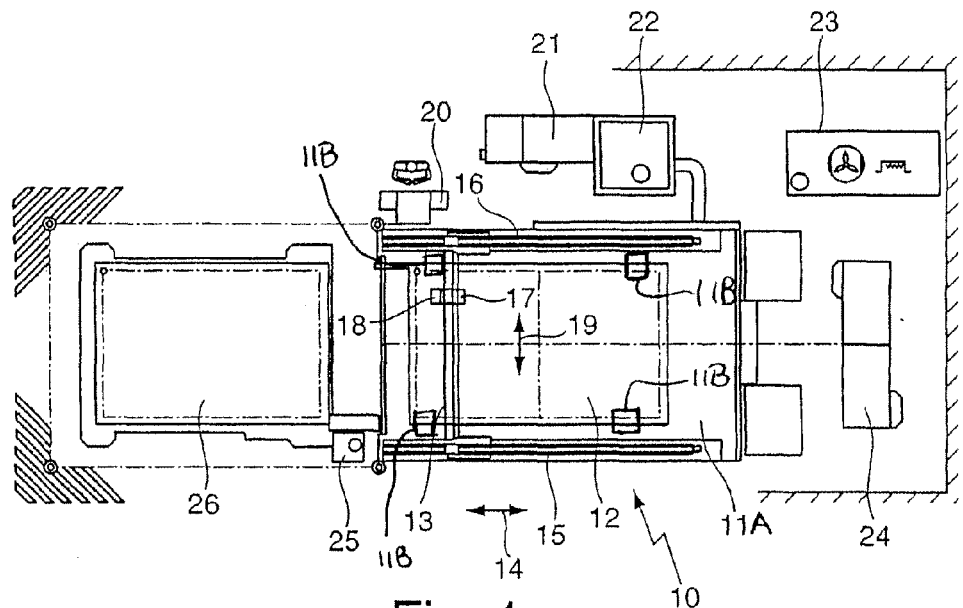
FIG. 1 is a plan view of a laser processing machine.
FIG. 2 is a plan view of a laser processing machine having four laser processing heads.
FIG. 3 is a schematic plan view of a laser processing machine having a plurality of laser processing heads which are arranged on a sliding member.

FIG. 1 illustrates a laser processing machine 10 having a workpiece support 11A, on which a workpiece 12 is arranged. Alternatively or additionally, the laser processing machine 10 may include one or more workpiece retention members 118 for retaining a workpiece for processing. Above the workpiece 12 a carrier structure 13 is arranged in the form of a portal. The carrier structure 13 can be moved along guides 15, 16 in the direction of the double-headed arrow 14. In this instance, the carrier structure 13 is driven by means of linear drives. The arrangement which brings about the movement in the direction of the double-headed arrow 14 is referred to as a (tool) axis. Laser processing heads 17, 18 are arranged at both sides of the carrier structure 13. These can be moved relative to the carrier structure 13 in the direction of the double-headed arrow 19. Arrangements which bring about a movement in the direction of the double-headed arrow 19 are also referred to as a (tool) axis. Owing to the fact that laser processing heads 17, 18 are arranged at both sides of the carrier structure, a maximum operating range is achieved. In particular, it would be possible to process a workpiece which is substantially as long as the guides 15, 16 and whose width almost corresponds to the spacing of the guides 15, 16.

Around the laser processing machine 10 there are further arranged additional devices, such as an operator console 20, a switch cabinet 21, an exhaust 22, a cooling unit 23, a power supply 24, a hydraulic unit 25 and a disc changer 26 for loading and unloading the workpieces.

In the configuration of a laser processing machine 30 according to FIG. 2, a total of four laser processing heads 32 to 35 are provided on the carrier structure 31, two laser processing heads 32, 35 and 33, 34 being arranged at each side of the carrier structure 31, respectively. The laser processing heads 32 to 35 are each arranged on a sliding member 36 to 39. The sliding members 36 to 39 can be moved in the direction of the double-headed arrows Y1 and Y2 and the entire carrier structure 31 in the direction of the double-headed arrow X. This means that an operating range or operating space indicated by the surface-area 40 can be processed by the laser processing machine 30. The operating range 40 substantially corresponds to the base surface-area 41 of the laser processing machine 30. Owing to the width of the carrier structure 31, there is no region produced which corresponds to the width of the carrier structure 31 and in which no processing operation can be carried out.

The laser processing heads 32 to 35 can either be arranged so as to be fixed in position, for example, centrally on the sliding members 36 to 39, or they may be located on a small additional axis so that a highly dynamic movement of the laser processing heads 32 to 35 relative to the sliding members 36 to 39 is possible.

In the laser processing machine 50 according to FIG. 3, two laser processing heads 55 to 62 are provided on each sliding member 51 to 54, respectively. The laser processing heads 55 to 62 can be arranged so as to be fixed in position on the sliding members 51 to 54 or be arranged so as to be able to be moved on the sliding members in a coupled state or independently of each other. The operating range is indicated with the reference numeral 63 and the base surface-area of the laser processing machine 50 with the reference numeral 64.

FIGS. 4a and 4b schematically illustrate the power switching between two laser processing heads 55, 66. In a beam generator 67, a beam is produced and supplied via a beam deflector 68 to the laser processing head 65 (FIG. 4a) or the laser processing head 66 (FIG. 4b). During the processing of a workpiece, it is therefore possible to switch from the laser processing head 65 to the laser processing head 66 at the appropriate location. To this end, the beam deflector 68 can be movably arranged and controlled by a control device.

As illustrated in FIG. 5, however, there may also be provision for a plurality of beam generators 69, 70 to be provided which each co-operate with an associated laser processing head 71, 72.

However, as can be seen in FIGS. 6a and 6b, there is also another possibility for adjusting the power when a plurality of beam generators 73, 74 are used. The beams of the beam generators 73, 74 can be directed onto a beam coupling module 75 where the laser power is at least partially added together and subsequently transferred to one of the laser processing heads 76, 77. The beam coupling module 75 can be movably arranged so that the laser power can be selectively transmitted to the laser processing head 76 (FIG. 6a) or 77 (FIG. 6b). Owing to the beam coupling module 75, it is optionally also possible to transmit only part of the coupled power to the laser processing heads 76, 77.

According to the configuration illustrated in FIGS. 7a to 7c, laser power can be produced using a beam generator 80 and transferred via a beam splitter module 81 to a first laser processing head 82 or a second laser processing head 83. In FIGS. 7a and 7b, the beam splitter module is passive. This means that the laser power of the beam generator 80 is transferred either to the laser processing head 82 (FIG. 7a) or to the laser processing head 83 (FIG. 7b). In FIG. 7c, the beam splitter module is active. This means that the laser power of the beam generator 80 is divided and a part of the laser power produced can be transferred to both laser processing heads 82, 83.

FIGS. 4 to 7 illustrate various beam guiding possibilities. This was illustrated by way of example by means of two opposing laser processing heads on a carrier structure. It will be appreciated that these concepts can also be transferred to a plurality of opposing laser processing heads on a carrier structure. Furthermore, it is conceivable to use the beam guiding concepts on two or more laser processing heads which are located at the same side of a carrier structure.

Figure 8:
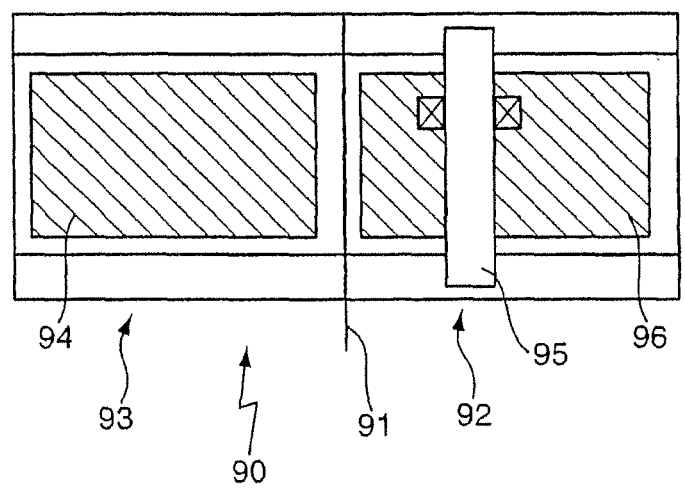
FIG. 8 shows a laser processing machine having a partition wall.

FIG. 8 illustrates a configuration of a laser processing machine 90 which has a partition wall 91. When the partition wall 91 is used, it is thereby possible to carry out a workpiece processing operation at one side 92 and to load or unload a workpiece 94 at the other side 93. Since the carrier structure with the laser processing head can be moved close to the partition wall from both sides, there is also practically no additional surface-area requirement in this operating mode. When the workpiece processing operation is complete at the right-hand side 92, the carrier structure 95 can be transferred to the left-hand side 93 so that a workpiece processing operation can be carried out at that location, while the workpiece 96 processed at the right-hand side 92 is removed and a new workpiece loaded. It is also conceivable to omit the partition wall 91 and to process a workpiece which extends at both sides 92, 93.

A number of embodiments of the invention have been described. Nevertheless, it will be understood that various modifications may be made without departing from the spirit and scope of the invention. Accordingly, other embodiments are within the scope of the following claims.

What is claimed is:

1. A laser processing machine comprising
a workpiece apparatus for supporting or retaining a workpiece to be processed;
a laser beam generator;
an elongated carrier structure having a longitudinal axis and a first side and a second side on opposing sides of the longitudinal axis and carrying at least two laser processing heads for directing a laser beam from the laser beam generator at a workpiece supported on or retained by the workpiece apparatus; and
a beam deflector operable to switch the laser beam between the laser processing heads;
wherein relative positioning of the laser processing heads and the workpiece apparatus is alterable to direct the laser beam to different points; and
wherein a first laser processing head is arranged on the first side of the carrier structure, and a second laser processing head is arranged on the second side of the carrier structure, such that the longitudinal axis of the carrier structure is located between the first and second laser processing heads.

2. The laser processing machine according to claim 1, wherein the carrier structure carries at least two laser processing heads on each of the two sides of the carrier structure.

3. The laser processing machine according to claim 1, wherein the laser processing heads are movable along the carrier structure.

4. The laser processing machine according to claim 1, wherein at least one of the laser processing heads has an additional control axis.

5. The laser processing machine according to claim 1, wherein the carrier structure is movable relative to the workpiece apparatus.

6. The laser processing machine according to claim 1, wherein a plurality of the laser processing heads are mounted to the carrier structure on at least one of the first and second opposing sides on a common sliding member.

7. The laser processing machine according to claim 1, comprising at least two beam generators.

8. The laser processing machine of claim 1, further comprising a beam splitter module arranged to split the laser beam between the laser processing heads.

9. The laser processing machine of claim 1, wherein the workpiece apparatus comprises a workpiece support for supporting a workpiece to be processed.

10. The laser processing machine of claim 1, wherein the workpiece apparatus comprises a workpiece retention member for retaining a workpiece to be processed.

11. The laser processing machine of claim 1, further comprising a partition wall positioned between two workpiece processing areas of the laser processing machine.

12. The laser processing machine of claim 1, wherein the first and second laser processing heads are arranged opposite each other on the first and second opposing sides of the carrier structure.

13. The laser processing machine according to claim 3, wherein the laser processing heads are movable independently of each other.

14. The laser processing machine according to claim 6, wherein at least one of the mounted laser processing heads is movable relative to the sliding member.

15. The laser processing machine according to claim 6, wherein the mounted laser processing heads are movable relative to the sliding member independently of each other.

16. The laser processing machine according to claim 7, further comprising a beam coupler arranged to couple laser beams of two beam generators to generate a coupled beam, and configured to supply the coupled beam to a laser processing head.

17. The laser processing machine of claim 9, further comprising a partition wall positioned between two workpiece processing areas of the workpiece support.

18. A laser processing machine comprising:

a workpiece apparatus for supporting or retaining a workpiece to be processed;

a laser beam generator;

an elongated carrier structure having a longitudinal axis and a first side and a second side on opposing sides of the longitudinal axis and carrying at least two laser processing heads for directing a laser beam from the laser beam generator at a workpiece supported on or retained by the workpiece apparatus; and a beam deflector operable to switch the laser beam between the laser processing heads;

wherein relative positioning of the carrier structure and the workpiece apparatus is alterable to direct the laser beam to different points;

wherein a first laser processing head is arranged on the first side of the carrier structure and a second laser processing head is arranged on the second side of the carrier structure, such that the longitudinal axis of the carrier structure is located between the first and second laser processing heads; and wherein the laser processing heads are spaced apart along a tool axis, such that a combined distance traversable by the first and second laser processing heads along the tool axis is greater than an extent of relative movement between the carrier structure and the workpiece apparatus along the tool axis.

19. The laser processing machine of claim 18, wherein the first and second laser processing heads are arranged opposite each other on the first and second opposing sides of the carrier structure.

* * * * *